US011360635B2

(12) United States Patent
Chundi et al.

(10) Patent No.: US 11,360,635 B2
(45) Date of Patent: Jun. 14, 2022

(54) CUSTOMIZING USER INTERFACE CONTROLS AROUND A CURSOR

(71) Applicant: Rovi Guides, Inc., San Jose, CA (US)

(72) Inventors: Charishma Chundi, Andhra Pradesh (IN); Rajendra Pandey, Karnataka (IN)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 17/075,252

(22) Filed: Oct. 20, 2020

(65) Prior Publication Data

US 2022/0121342 A1 Apr. 21, 2022

(51) Int. Cl.
*G06F 3/04812* (2022.01)
*G06F 3/04815* (2022.01)
*G06F 3/04883* (2022.01)
*G06T 19/00* (2011.01)
*G06F 3/0482* (2013.01)
*G02B 27/01* (2006.01)

(52) U.S. Cl.
CPC ........ *G06F 3/04812* (2013.01); *G06F 3/0482* (2013.01); *G06F 3/04815* (2013.01); *G06F 3/04883* (2013.01); *G06T 19/006* (2013.01); *G02B 27/0172* (2013.01)

(58) Field of Classification Search
CPC ............... G06F 3/0482; G06F 3/04812; G06F 3/04815; G06F 3/04883; G06T 19/006; G02B 27/0172
See application file for complete search history.

(56) References Cited

U.S. PATENT DOCUMENTS

| | | | |
|---|---|---|---|
| 9,389,718 B1* | 7/2016 | Letourneur | G06F 3/0414 |
| 2008/0222569 A1* | 9/2008 | Champion | G06F 3/0482 |
| | | | 715/834 |
| 2010/0271312 A1* | 10/2010 | Alameh | G06F 3/0421 |
| | | | 345/173 |
| 2013/0111403 A1* | 5/2013 | Nakamura | B60K 35/00 |
| | | | 715/810 |
| 2016/0274748 A1* | 9/2016 | Feng | G06F 3/04817 |
| 2019/0324636 A1* | 10/2019 | Kolondra | G06F 3/04817 |

* cited by examiner

*Primary Examiner* — Mong-Shune Chung
(74) *Attorney, Agent, or Firm* — Haley Guiliano LLP

(57) ABSTRACT

Systems and methods are provided for customizing user interface controls around a cursor. One example method includes receiving, at a computing device, a request to display an indicator menu and identifying at least one user interface element of a program being executed at the computing device. An interaction frequency for each identified user interface element is generated. In response to the request and for each identified user interface element, a spatial relationship between an indicator of the computing device and the identified user interface element is determined. Based on the interaction frequency value and the determined spatial relationship, an element set comprising one or more of the identified user interface elements is generated. The indicator menu comprising at least a portion of the element set is generated for display. The indicator menu is displayed proximate the indicator on a display of the computing device.

18 Claims, 7 Drawing Sheets

CUSTOMIZING USER INTERFACE CONTROLS AROUND A CURSOR

BACKGROUND

The disclosure relates to displaying user interface controls around a cursor and, in particular, systems and related methods for determining which user interface controls of a program being executed are placed around a cursor.

SUMMARY

With the proliferation of computing devices, such as laptops, smartphones, tablets, augmented reality devices, mixed reality devices and virtual reality devices, there has been an increase in the use of systems that comprise an indicator and user interface elements to enable a user to interact with the system. For example, a media player program on a laptop may enable a user to view a video via the laptop screen. The media player may have different user interface elements that enable the user to perform different actions, such as displaying subtitles, fast-forwarding the video and/or resizing the video. Typically these user interface elements will be displayed in different areas of the laptop screen. The laptop may comprise a mouse, touchpad or touchscreen that enables a user to control a cursor to interact with the user interface elements. For example, a user interface element enabling the user to display subtitles may be displayed in the top right-hand corner of the screen, a user interface element enabling a user to fast-forward the video may be displayed in the middle bottom portion of the screen and a user interface element enabling a user to resize the video may be displayed in the top left-hand corner of the screen. As such, the system may require excessive input in order to achieve a desired sequence of events. For example, the laptop cursor may need to be moved an excessive amount, especially if the desired sequence comprises moving repeatedly between user interface elements that are located in different areas of the screen. Although the above example describes a media player on a laptop, similar issues exist with other programs, such as computer-aided design (CAD) software, and/or within augmented reality environments and/or with software running on different computing devices.

In the case of CAD software, there may be hundreds of user interface elements that are available to a user. Such user interface elements are generally organized and contained within menus and sub-menus, and it can take at least several interactions to navigate from one user interface element to another. In practice, a user of CAD software will use a few user interface elements on a regular basis, e.g., sketch, extrude, cut-out, chamfer, fillet, zoom, rotate, and many of the other user interface elements, i.e., thread, Boolean coordinates, material properties, split, far less frequently. Each time the user interacts with an infrequently used user interface element, they are required to exit several menus and submenus to navigate back to their favored user interface elements.

In view of the foregoing, it would be beneficial to have a system that allows customization of one or more user interface elements of a program that reduces the input to interact with the user interface elements.

Systems and methods are described herein for displaying an indicator menu proximate an indicator. In accordance with an aspect of the disclosure, a method is provided for generating for display an indicator menu. The method includes receiving a request to display an indicator menu at a computing device. An input indicating a request to display an indicator menu may comprise, for example, a user pressing the right button of a mouse in communication with a computing device. Other input examples include a touch event registered via touchscreen of a computing device, the touch event having a duration longer than a threshold amount of time and/or an augmented reality device registering a specific gesture from a motion controller.

At least one user interface element of a program being executed at the computing device is identified. A user interface element is any part of a program that a user can use to provide input to the program, for example, a button for fast-forwarding a video being played on a media player program. An interaction frequency value for each identified user interface element is generated. For example, this may be a set of values that indicate how many times a user has interacted with each identified user interface element since first using the program, and/or this may be a set of pre-generated values that indicate how often a typical user would interact with each identified user interface element. In response to the request and for each identified user interface element, a spatial relationship between an indicator of the computing device and the identified user interface element is determined. For example, the determined spatial relationship may be a distance between a cursor of a laptop and a user interface element or the distance between a touch event on a touch screen and a user interface element.

Based on the interaction frequency value and the determined spatial relationship, an element set comprising one or more of the identified user interface elements is generated. Utilizing the element set, an indicator menu comprising at least a portion of the element set is generated for display, and the indicator menu is displayed proximate the indicator on a display of the computing device. For example, a radial menu comprising fast-forward, rewind and play may be displayed proximate a cursor on a screen of a laptop. The radial menu may comprise one or more concentric rings of menu items. In other examples, different menu types may be displayed, such a linear menu or a combination of a radial and a linear menu.

The method may further include determining the spatial relation by determining a distance between the indicator of the computing device and each identified user interface element. Generating the element set may further include, for each identified user interface element, determining whether the distance is greater than a threshold distance value and, where the distance is greater than the threshold distance value, adding the identified user interface element to the element set, determining whether the number of user interface elements in the element set is greater than a threshold element value and removing from the element set, based on the interaction frequency value for each identified user interface element, user interface elements, until the number of user interface elements is equal to the threshold element value.

The indicator may be an augmented reality indicator displayed in an augmented reality environment, or a virtual reality indicator displayed in a virtual reality environment. Where the environment is an augmented reality environment, whether the user interface element is associated with an object in the environment or has a location that is independent of the environment is identified. In a similar manner, where the environment is a virtual reality environment, whether the user interface element has a location that is associated with a virtual reality object or has a location that is independent of an object in the virtual reality environment is identified. For each identified user interface element, a distance between the respective augmented reality indicator or virtual reality indicator and the user interface element is determined. For each identified user interface element, whether the distance is greater than a threshold distance value is determined and, where the distance is greater than the threshold distance value, the identified user interface element is added to the element set.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout and in which.

DETAILED DESCRIPTION

Figure 1:
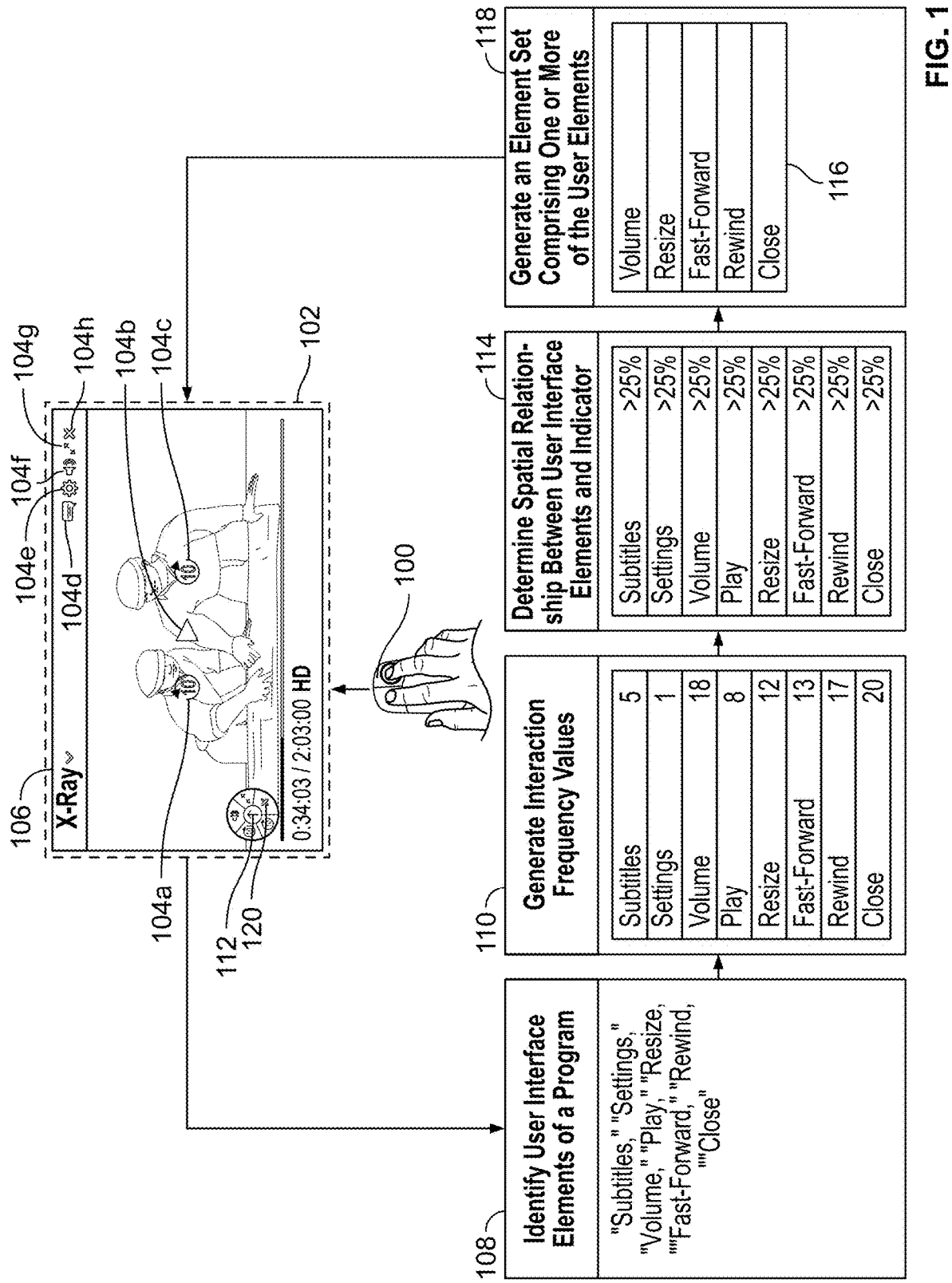
FIG. 1 shows an exemplary environment in which a request to display an indicator menu is received and an indicator menu is displayed, in accordance with some embodiments of the disclosure.

Systems and methods are described herein for displaying an indicator menu proximate an indicator. As referred to herein, an indicator menu is any menu that is displayable proximate or near an indicator. The menu may be a radial menu that partially or totally encircles or surrounds an indicator when displayed on a display. Alternatively, the menu may be a linear menu that, for example, drops down from the indicator. In another example, the menu may be a combination of a radial menu and a linear menu, for example, a semi-circle that surrounds a top portion of the indicator and a linear menu that drops down from a bottom portion of the indicator. An indicator is any indication and/or pointer on a display that allows a user to interact with user interface elements of a program. The pointer may also be implied, for example, an area proximate and/or beneath a touch event. For example, the indicator may be a pointer, a cursor, an augmented reality pointer, a mixed reality pointer, a virtual reality pointer, a representation of a user's hand or hands, and/or a representation of a controller, such as a motion controller.

A request to display an indicator menu may be generated by any device that can provide an input, i.e., for example, speaking to voice recognition element, pressing a button on a mouse, interacting with a touchpad, touching a display of a device, using a gesture on a touchscreen, using a gesture that is captured by a camera and/or disturbs an electromagnetic field, interacting with a motion controller, inputting eye movements to an eye tracking device and/or inputting signals into a wrist-mounted electromyography controller.

A user interface element is any part of the user interface of a program that a user can interact with. This includes, for example, controls of a media player such as play, rewind and fast-forward. This also includes controls that are used in CAD software, such as sketch, calculate dimension and project geometry. Another example is controls that are used in image editing software, such as draw, fill and brushes. A further example is controls that are used in text editing software, such as bold, underline or italic. The identified user interface elements can be global user interface elements (i.e., identified from all of the user interface elements of a program). Alternatively, the identified user interface elements can be from a subset of the global user interface elements that pertain to a certain task that is performed in a program, for example, user interface elements that are specific to manipulating an object in CAD software.

The disclosed methods and systems may be implemented on a computing device. As referred to herein, the computing device can be any device comprising a processor and memory, for example, a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, an augmented reality device, a mixed reality device, a virtual reality device, or any other television equipment, computing equipment, or wireless device, and/or combination of the same.

The display of a computing device may be a display that is largely separate from the rest of the computing device, for example one or more computer monitors. Alternatively, it may be a display that is integral to the computing device, for example the screen or screens of a mobile phone or tablet. In other examples, the display may comprise the screens of a virtual reality headset, an augmented reality headset or a mixed reality headset.

Where an embodiment encompasses an augmented reality device, such an embodiment also encompasses a mixed reality device. An augmented reality device is one that comprises a display that shows an image of the world (captured, for example, by a camera), with interactive objects overlaid onto the world. Augmented reality tends to be displayed via a screen of, for example, a mobile phone or tablet. Mixed reality is an extension of augmented reality that is typically experienced through a headset that shows the world, but with additional interactable virtual reality objects.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, Random Access Memory (RAM), etc.

FIG. 1 shows an exemplary environment in which a request to display an indicator menu is received and an indicator menu is displayed, in accordance with some embodiments of the disclosure. A request to display an indicator menu is generated by a user interacting with a mouse 100. In this example, the user presses the right-hand button of the mouse 100 to generate the request to display an indicator menu. The request is received by a personal computer 102. On receiving the request, at least one user interface element 104a-h of a program 106 being executed at the personal computer 102 is identified 108. In this example, the program 106 is a media player and the identified user interface elements are rewind 104a, play 104b, fast-forward 104c, subtitles 104d, settings 104e, volume 104f, resize 104g and close 104h.

Interaction frequency values are generated for each identified user interface element 110. The interaction frequency values may be a set of values that indicate how many times a user has interacted with each identified user interface element since, for example, first using the program (i.e., the values change as the program is used). Alternatively, the interaction frequency values may be a set of pre-generated values that indicates how often a typical user would interact with each identified user interface element (i.e., the values are static). In another example, a trained artificial intelligence model analyses how a user interacts with the program and generates interaction frequency values that are indicative of a prediction of how often a user is likely to interact with a user interface element based on the user behavior. For example, the model may determine that a user frequently watches foreign movies and, as such, is likely to interact with the subtitle element more often.

A spatial relationship between the identified user interface elements and the location of a cursor 112 when the request to display an indicator menu is received is determined 114. The absolute distance between the cursor 112 and each user interface element 104a-h may be determined. Alternatively, a relative distance between the cursor 112 and each user interface element 104a-h, for example with respect to a diagonal distance of the display, may be determined. Different environments may utilize, for example, different coordinate systems. A system comprising a two-dimensional environment may utilize a Cartesian coordinate system, whereas a system comprising a three-dimensional environment may utilize spherical polar or cylindrical coordinates.

An element set 116 based on the interaction frequency values of each identified user interface element 104a-h and the spatial relationship between the cursor 112 and each identified user interface element 104a-h is generated 118. For example, a weighted score may be generated based on the interaction frequency values and the distance, to order the user interface elements 104 in the element set 116 based on frequency of use and distance from the cursor 112. Alternatively, only user interface elements 104 that are over a threshold distance from the cursor 112 are included in the element set 116. In another example, there may be a limited number of user interface elements 104 that can be displayed in an indicator menu 120 proximate the cursor 112. To address this limitation, the user interface elements 104 in the element set 116 may be reduced based on the interaction frequency values until the number of user interface elements 104 in the element set 116 is equal to the number of user interface elements 104 that can be displayed in the indicator menu 120. Where a user interface element 104 that is typically paired with another user interface element 104 (for example fast-forward and rewind), the paired user interface element 104 may have an additional weighting associated with it, such that the pair of user interface elements is more likely to appear in the indicator menu 120.

Utilizing the generated element set 116, the indicator menu 120 is generated for display and is displayed proximate the cursor 112 on a display of the personal computer 102. At least some of the user interface elements 104 from the element set 116 are displayed in the indicator menu 120. However, for example, where an indicator menu 120 comprises more than one layer, only a subset of the user interface elements 104 may be displayed. The order of the user interface elements in the indicator menu 120 may be determined by the order of the items in the element set 116. For example, the first user interface element 104 of the element set 116 may appear directly above the cursor 112, and the indicator menu 120 may be populated with subsequent items in a clockwise fashion. Although the indicator menu 120 is depicted as a radial menu comprising a single ring around the cursor 112, in some examples the radial menu may comprise one or more concentric rings of menu items. In other examples, different menu types may be displayed, such a linear menu or a combination of a radial and a linear menu. The indicator menu 120 may display a subset of the user interface elements 104 in the element set 116 and may display further user interface elements 104 as the cursor 112 is moved or on receipt of an additional command from the user.

Figure 2:
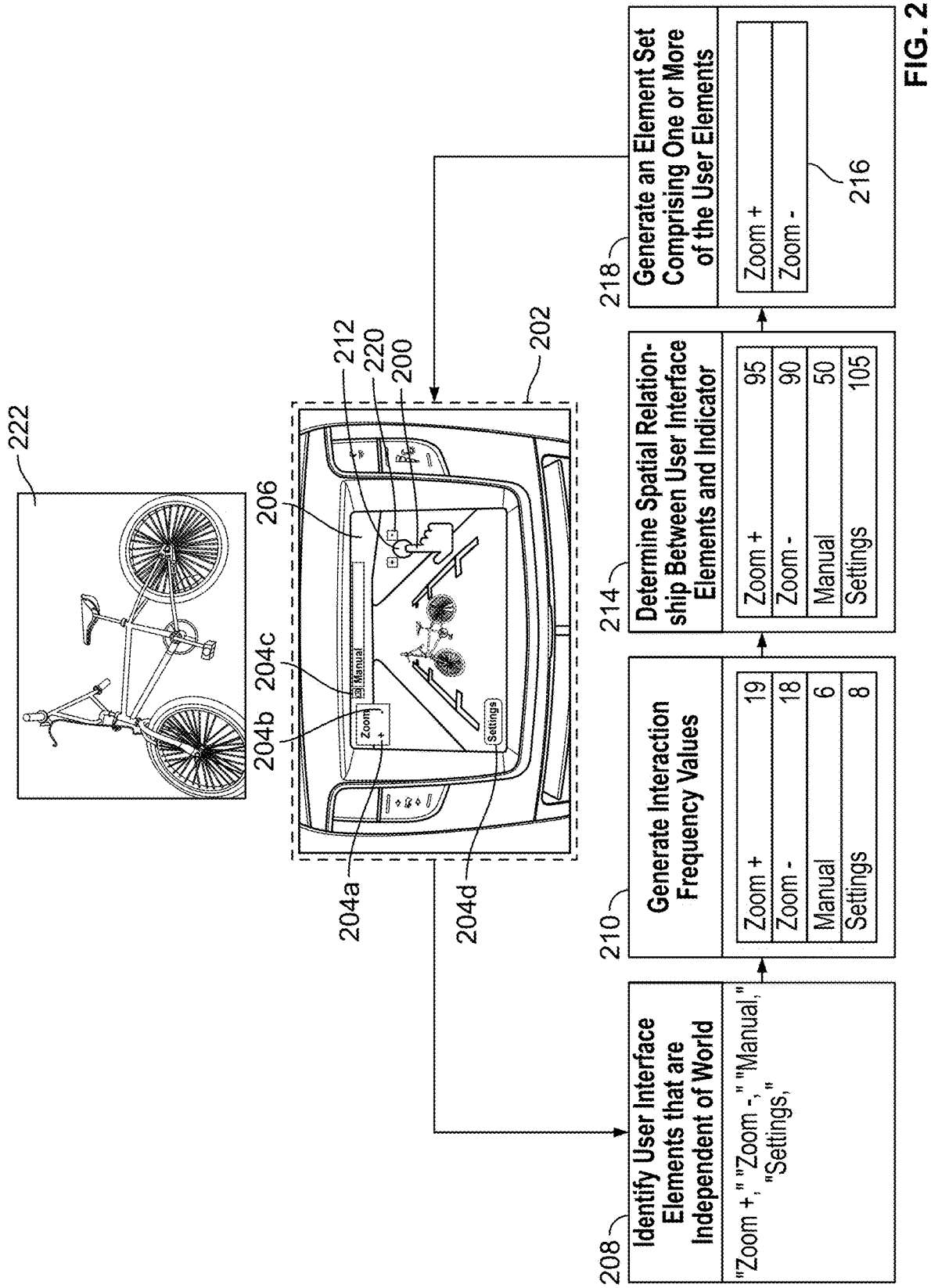
FIG. 2 shows an exemplary environment in which a request to display an indicator menu is received at an augmented reality device and an indicator menu is displayed, in accordance with some embodiments of the disclosure.

FIG. 2 shows an exemplary environment in which a request to display an indicator menu is received at an augmented reality device and an indicator menu is displayed, in accordance with some embodiments of the disclosure. A request to display an indicator menu is generated by a user touching 200 a touchscreen of an augmented reality device 202. When the user touches 200 the touchscreen, the user generates a touch event 212. In this example, the user touches 200 the touchscreen for longer than a threshold amount, for example two seconds, thereby generating the request to display an indicator menu. In another example, the user may perform a specific gesture, such as a swipe or a three-fingered touch in order to generate the request to display an indicator menu. The request is received by the augmented reality device 202. In this example, the augmented reality device 202 is a computer of a car that receives, and displays, an input from a camera at the rear of the car. However, other augmented reality devices are contemplated, such as a mobile phone, augmented reality glasses, or any other device that displays the real world on one or more displays and augments the display with computer-generated information and/or objects. Where augmented reality devices are referred to, mixed reality devices are also contemplated. A mixed reality device is a device that displays virtual reality objects alongside real-world objects to a user.

On receiving the request, at least one user interface element 204a-d, that is independent of objects in the real world, of a program 206 being executed at the augmented reality device 202 is identified 208. User interface elements that are independent of the real world are those that remain constant and that are not dependent on the real world. Typically, this would include user interface elements that allow the user to change, for example, settings associated with the device. Further, these user interface elements 204a-d typically occupy a fixed position on the display of the augmented reality device 202. A label that describes, for example, what is in the real world or provides information associated with a real-world object would not be a user interface element that is independent of the world. In this example, the program 206 is a reversing aid that overlays reversing guidance lines over an image of the real word 222 when a user is reversing the car. The identified user interface elements are Zoom+ 204a, Zoom− 204b, Manual 204c, and Settings 204d.

Interaction frequency values are generated for each identified user interface element 210, as described in connection with FIG. 1 above. A spatial relationship between the identified user interface elements 204a-d and the location of the touch event 212 on the display of the augmented reality device 202 when the request to display an indicator menu is received is determined 214. The absolute distance between the touch event 212 and each user interface element 204a-d may be determined. Alternatively, a relative distance between the touch event 212 and each user interface element 204a-d, for example with respect to a diagonal distance of the display, may be determined. As described in connection with FIG. 1 above, different environments may utilize, for example, different coordinate systems.

An element set 216 based on the interaction frequency values of each identified user interface element 204a-d and the spatial relationship between the touch event 212 and each identified user interface element 204a-d is generated 218. For example, a weighted score may be generated based on the interaction frequency values and the distance, to order the user interface elements 204 in the element set 216 based on frequency of use and distance from the touch event 212. Alternatively, only user interface elements 204 that are over a threshold distance from the touch event 212 are included in the element set 216. In another example, there may be a limited number of user interface elements 204 that can be displayed in the indicator menu 220 proximate the touch event 212. To address this limitation, the user interface elements 204 in the element set 116 may be reduced based on the interaction frequency values until the number of user interface elements 204 in the element set 216 is equal to the number of user interface elements 204 that can be displayed in an indicator menu 220. Where a user interface element 204 that is typically paired with another user interface element 204 (for example fast-forward and rewind), then the paired user interface element 204 may have an additional weighting associated with it, such that the pair of user interface elements is more likely to appear in the indicator menu 220.

Utilizing the generated element set 216, the indicator menu 220 is generated for display and is displayed proximate the touch event 212 on the display of the augmented reality device 202. At least some of the user interface elements 204 from the element set 216 are displayed in the indicator menu 220. However, for example, where an indicator menu 220 comprises more than one layer, only a subset of the user interface elements 204 may be displayed. The order of the user interface elements in the indicator menu 220 may be determined by the order of the items in the element set 216. For example, the first user interface element 204 of the element set 216 may appear directly above the touch event 212, and the indicator menu 220 may be populated with subsequent items in a clockwise fashion. Although the indicator menu 220 is depicted as a radial menu comprising a single ring around the touch event 212, in some examples the radial menu may comprise one or more concentric rings of menu items. In other examples, different menu types may be displayed, such a linear menu or a combination of a radial and a linear menu. The indicator menu 220 may display a subset of the user interface elements 204 in the element set 216 and may display further user interface elements 204 on receipt of an additional command from the user.

Figure 3:
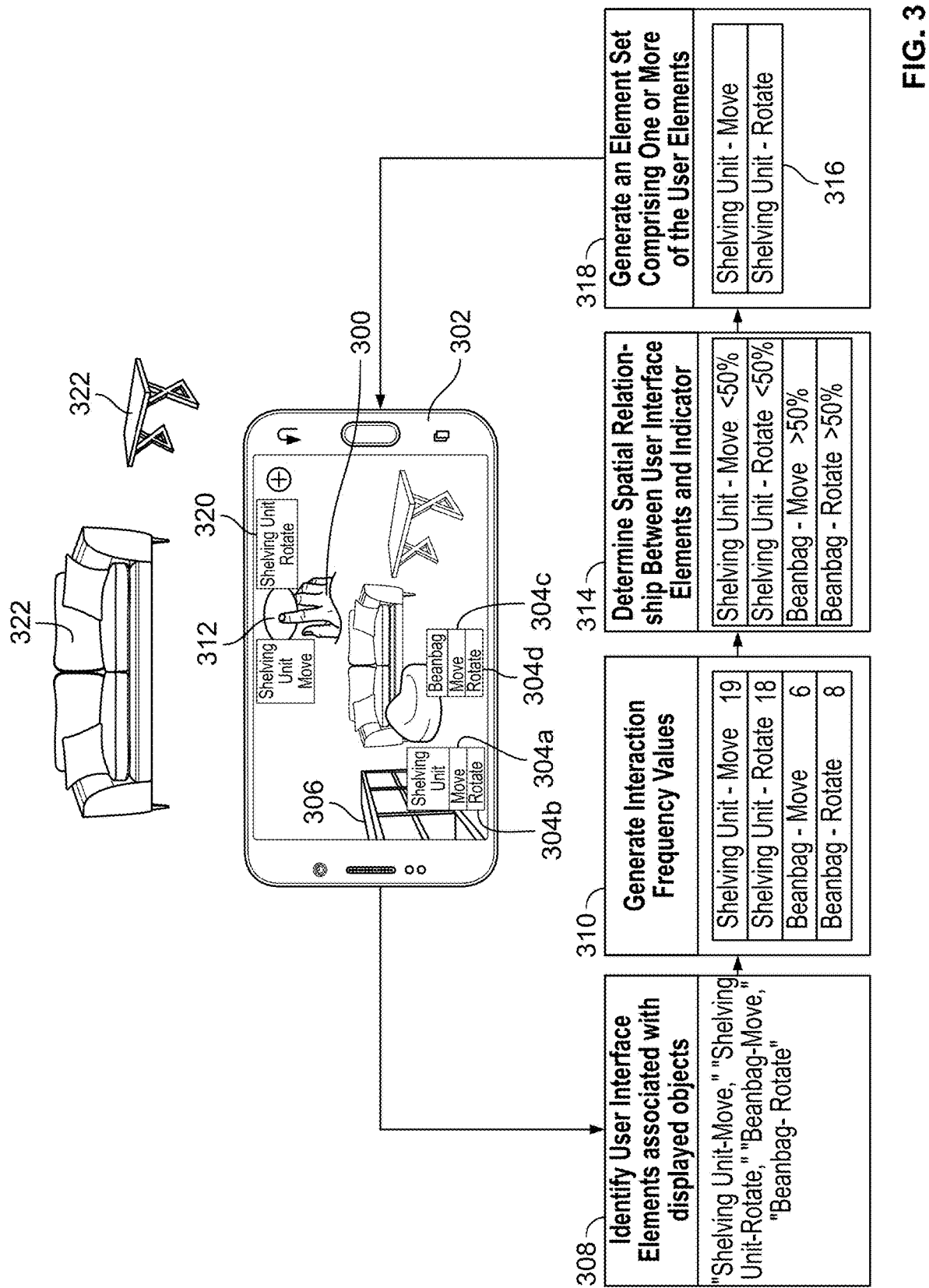
FIG. 3 shows another exemplary environment in which a request to display an indicator menu is received at an augmented reality device and an indicator menu is displayed, in accordance with some embodiments of the disclosure.

FIG. 3 shows an exemplary environment in which a request to display an indicator menu is received at an augmented reality device and an indicator menu is displayed, in accordance with some embodiments of the disclosure. A request to display an indicator menu is generated by a user touching 300 a touchscreen of an augmented reality device 302. When the user touches 300 the touchscreen, the user generates a touch event 312. In this example, the user touches 300 the touchscreen for longer than a threshold amount, for example two seconds, thereby generating the request to display an indicator menu. In another example, the user may perform a specific gesture, such as a swipe or a three-fingered touch in order to generate the request to display an indicator menu. The request is received by the augmented reality device 302. In this example, the augmented reality device 302 is a mobile phone. However, other augmented reality devices are contemplated, such as augmented reality glasses, or any other device that displays the real world on one or more displays and augments the display with computer-generated information and/or objects. Where augmented reality devices are referred to, mixed reality devices are also contemplated. A mixed reality device is a device that displays virtual reality objects alongside real-world objects to a user.

On receiving the request, at least one user interface element 304a-d that is dependent on displayed objects of a program 306 being executed at the augmented reality device 302 is identified 308. User interface elements that are dependent on displayed objects are those that are displayed in connection with either a) real-world objects (i.e., using image recognition to identify objects from an input from a camera, which is displayed on a screen) orb) objects that are displayed on a display and augment the real world that is displayed on the display. Typically, this would include user interface elements that allow the user to move, for example, an object that augments the real world, or, for example, a label that a user can interact with to find out more information about a real-world object. Further, these user interface elements 304a-d typically occupy a fixed position on the display of the augmented reality device 302. A label that describes, for example, what is in the real world or provides information associated with a real-world object would not be a user interface element that is independent of the world. In this example, the program 306 is a shopping aid that allows a user to overlay items of furniture in image of the real word 322. The identified user interface elements are Shelving unit—Move 304a, Shelving unit—Rotate 304b, Beanbag—Move 304c, and Beanbag—Rotate 304d. Identifying all user interface elements that are both independent and dependent on displayed objects from the real world is also contemplated.

Interaction frequency values are generated for each identified user interface element 310, as described in connection with FIG. 1 above. A spatial relationship between the identified user interface elements 304a-d and the location of the touch event 312 on the display of the augmented reality device 302 when the request to display an indicator menu is received is determined 314, as described in connection with FIG. 2 above. As described in connection with FIG. 1 above, different environments may utilize, for example, different coordinate systems.

An element set 316 based on the interaction frequency values of each identified user interface element 304a-d and the spatial relationship between the touch event 312 and each identified user interface element 304a-d is generated 318, as described in connection with FIG. 2 above.

Utilizing the generated element set 316, the indicator menu 320 is generated for display and is displayed proximate the touch event 312 on the display of the augmented reality device 302, as described in connection with FIG. 2 above.

Figure 4:
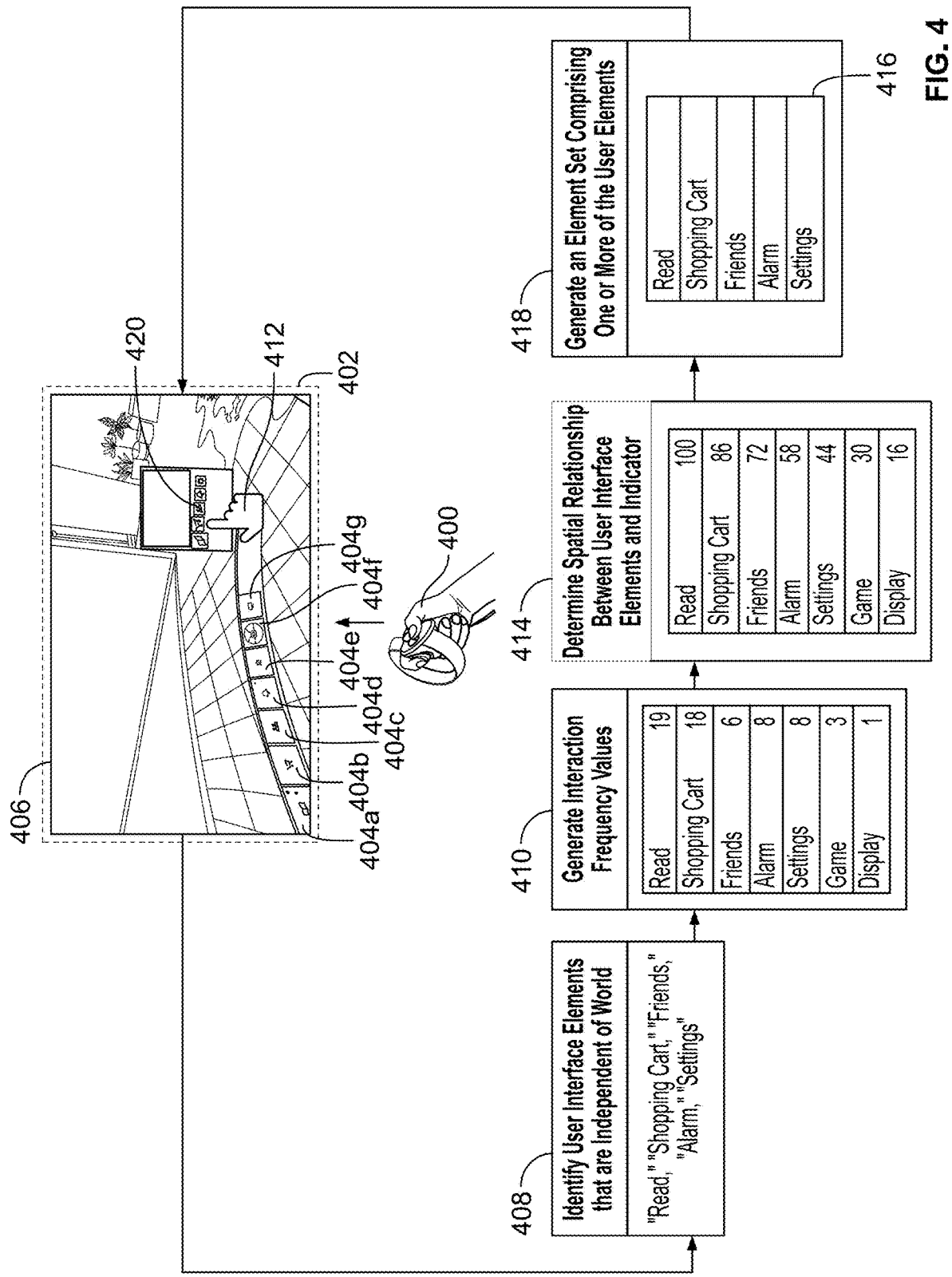
FIG. 4 shows an exemplary environment in which a request to display an indicator menu is received at a virtual reality device and an indicator menu is displayed, in accordance with some embodiments of the disclosure

FIG. 4 shows an exemplary environment in which a request to display an indicator menu is received at a virtual reality device and an indicator menu is displayed, in accordance with some embodiments of the disclosure. A request to display an indicator menu is generated by a user interacting with a motion control device 400. In this example, the user presses a button on the motion control device 400 to generate the request to display an indicator menu. In other examples, the user may perform a specific gesture with the motion control device 400. The request is received by a virtual reality device 402. In this example, the virtual reality device 402 comprises a computer and a virtual reality headset. The display of a virtual reality headset may comprise two screens, one for each eye of a user. However, any other virtual reality device that displays a virtual reality environment on one or more displays is contemplated.

On receiving the request, at least one user interface element 404a-e that is independent of objects in the virtual reality environment of a program 406 being executed at the virtual reality device 402 is identified 408. User interface elements that are independent of the virtual reality environment are those that remain constant and that are not dependent on the virtual reality environment. Typically, this would include user interface elements that allow the user to change, for example, settings associated with the device. Further, these user interface elements 404a-e typically occupy a fixed position on the display of the virtual reality device 402. In this example, the program 406 is a virtual reality environment with which a user can interact. The identified user interface elements are Read 404a, Shopping Cart 404b, Friends 404c, Alarm 404d, Settings 404e, Game 404f and Display 404g.

Although not displayed in FIG. 4, at least one user interface element that is dependent on objects in a virtual reality environment of a program being executed at the virtual reality device may be identified. Such an example would work in a similar fashion to the augmented reality device described in connection with FIG. 3. User interface elements that are dependent on objects in the virtual reality environment are those that are displayed in connection with objects present in the virtual reality environment. Typically, this would include, for example, user interface elements that allow the user to move, for example, a virtual reality object or, for example, a label that a user can interact with to find out more information about a virtual reality object. Identifying all user interface elements that are both independent and dependent on objects in a virtual reality environment is also contemplated.

Interaction frequency values are generated for each identified user interface element 410, as described in connection with FIG. 1 above. A spatial relationship between the identified user interface elements 404a-g and the location of a representation of a user's hand 412 on the display of the virtual reality device 402 when the request to display an indicator menu is received is determined 414. The absolute distance between the representation of the user's hand 412 and each user interface element 404a-g may be determined. Alternatively, a relative distance between the representation of the user's hand 412 and each user interface element 404a-g, for example with respect to a diagonal distance of the display, may be determined. As described in connection with FIG. 1 above, different environments may utilize, for example, different coordinate systems.

An element set 416 based on the interaction frequency values of each identified user interface element 404a-g and the spatial relationship between representation of the user's hand 412 and each identified user interface element 204a-g is generated 418, as discussed in connection with FIG. 2 above.

Utilizing the generated element set 416, an indicator menu 420 is generated for display and is displayed proximate the representation of a user's hand 412 on the display of the virtual reality device 402. At least some of the user interface elements 404 from the element set 416 are displayed in the indicator menu 420, as discussed in connection with FIG. 2 above. Although the indicator menu 420 is depicted as a linear menu, in some examples the menu may comprise a radial menu proximate and/or around the representation of the user's hand and/or one or more concentric rings of menu items. In other examples, different menu types may be displayed, such a combination of a radial and a linear menu. The indicator menu 420 may display a subset of the user interface elements 404 in the element set 416 and may display further user interface elements 404 on receipt of an additional command from the user.

Figure 5:
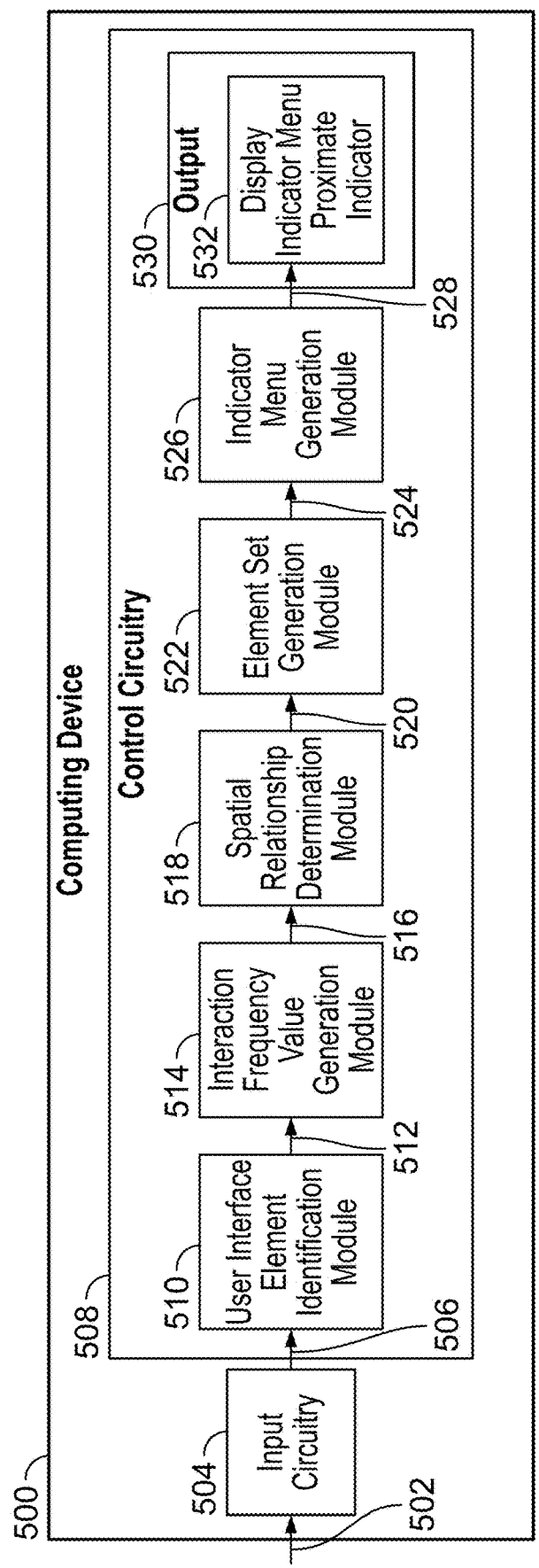
FIG. 5 is a block diagram representing components of a computing device and data flow therebetween for receiving a request to display an indicator menu and for displaying an indicator menu, in accordance with some embodiments of the disclosure.

FIG. 5 is a block diagram representing components of a computing device and data flow therebetween for receiving a request to display an indicator menu and for displaying an indicator menu, in accordance with some embodiments of the disclosure. Computing device 500 (e.g., a device 102, 202, 302, 402 as discussed in connection with FIGS. 1-4) and comprises input circuitry 504, control circuitry 508 and an output module 530. Control circuitry 508 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Some control circuits may be implemented in hardware, firmware, or software.

A user provides an input 502, which is received by the input circuitry 504. The input circuitry 504 is configured to receive input from a device that is integral to or separate from the computing device 500, for example, a button click on a mouse, a touch and/or gesture on a touchpad, a touch and/or gesture on touchscreen, and/or a keystroke and/or combination of keystrokes on a keyboard. Transmission of the input 502 from the input device to the input circuitry 504 may be accomplished using wired means, such as a USB cable, or wireless means, such as BLUETOOTH. The input circuitry 504 determines whether the input is a request to display an indicator menu and, if so, transmits an indication to the control circuitry 508 that a request to display an indicator menu has been received.

The control circuitry 508 comprises a user interface element identification module 510, an interaction frequency value generation module 514, a spatial relationship determination module 518, an element set generation module 522 and an indicator menu generation module 526. Upon the control circuitry 508 receiving the indication from the input circuitry 504, the user interface element identification module 510 identifies one or more user interface elements of a program being executed at the computing device and transmits 512 an indication of the identified user interface elements to the interaction frequency value generation module 514.

The interaction frequency value generation module 514 generates an interaction frequency value for each identified user interface element. As discussed above, the interaction frequency values may be a set of values that indicate how many times a user has interacted with each identified user interface element since, for example, first using the program (i.e., the values change as the program is used). Alternatively, the interaction frequency values may be a set of values that indicate how often a typical user would interact with each identified user interface element (i.e., the values are static). In another example, a trained artificial intelligence model analyses how a user interacts with the program and generates interaction frequency values that are indicative of a prediction of how often a user is likely to interact with a user interface element based on the user's behavior. The indication from the input circuitry 504 is also transmitted 516 to the spatial relationship determination module 518.

The spatial relationship determination module 518 determines, for each identified user interface element, a spatial relationship between an indicator of the computing device 500 and the identified user interface element. As discussed above, the absolute distance between an indicator of the computing device 500 and each user interface element may be determined. Alternatively, a relative distance between the indicator and each user interface element, for example with respect to a diagonal distance of a display of the computing device 500, may be determined.

For each identified user interface element, the element set generation module 522 receives 520 the interaction frequency value and the determined spatial relationship and generates, based on the interaction frequency value and the determined spatial relationship, an element set comprising one or more of the identified user interface elements. As discussed above, for example, a weighted score may be generated based on the interaction frequency values and the distance, to order the user interface elements in the element set based on frequency of use and distance from the indicator. Alternatively, only user interface elements that are over a threshold distance from the indicator are included in the element set. In another example, there may be a limited number of user interface elements that can be displayed in the indicator menu. To address this limitation, the number of user interface elements in the element set may be reduced based on the interaction frequency values until the number of user interface elements in the element set is equal to the number of user interface elements that can be displayed in an indicator menu. Where a user interface element that is typically paired with another user interface element (for example fast-forward and rewind), the paired user interface element may have an additional weighting associated with it, such that the pair of user interface elements is more likely to appear in the indicator menu.

The indicator menu generation module 526 receives 524 the element set from the element set generation module 522 and generates an indicator menu based on the element set. As discussed above, at least some of the user interface elements from the element set are displayed in the indicator menu. However, in some examples, where an indicator menu comprises more than one layer, only a subset of the user interface elements may be displayed. The order of the user interface elements in the indicator menu may be determined by the order of the items in the element set. For example, the first user interface element of the element set may appear directly above the touch event, and the indicator menu may be populated with subsequent items in a clockwise fashion. The indicator menu may be a radial menu comprising a single ring that encircles the indicator. In some examples, the radial menu may comprise one or more concentric rings of menu items. In other examples, different menu types may be displayed, such a linear menu or a combination of a radial and a linear menu. The indicator menu may display a subset of the user interface elements in the element set and may display further user interface elements on receipt of an additional command from the user.

The output module 530 receives 528 the generated indicator menu from the indicator menu generation module 526 and displays 532 the generated indicator menu proximate the indicator on a display of the computing device 500.

Figure 6:
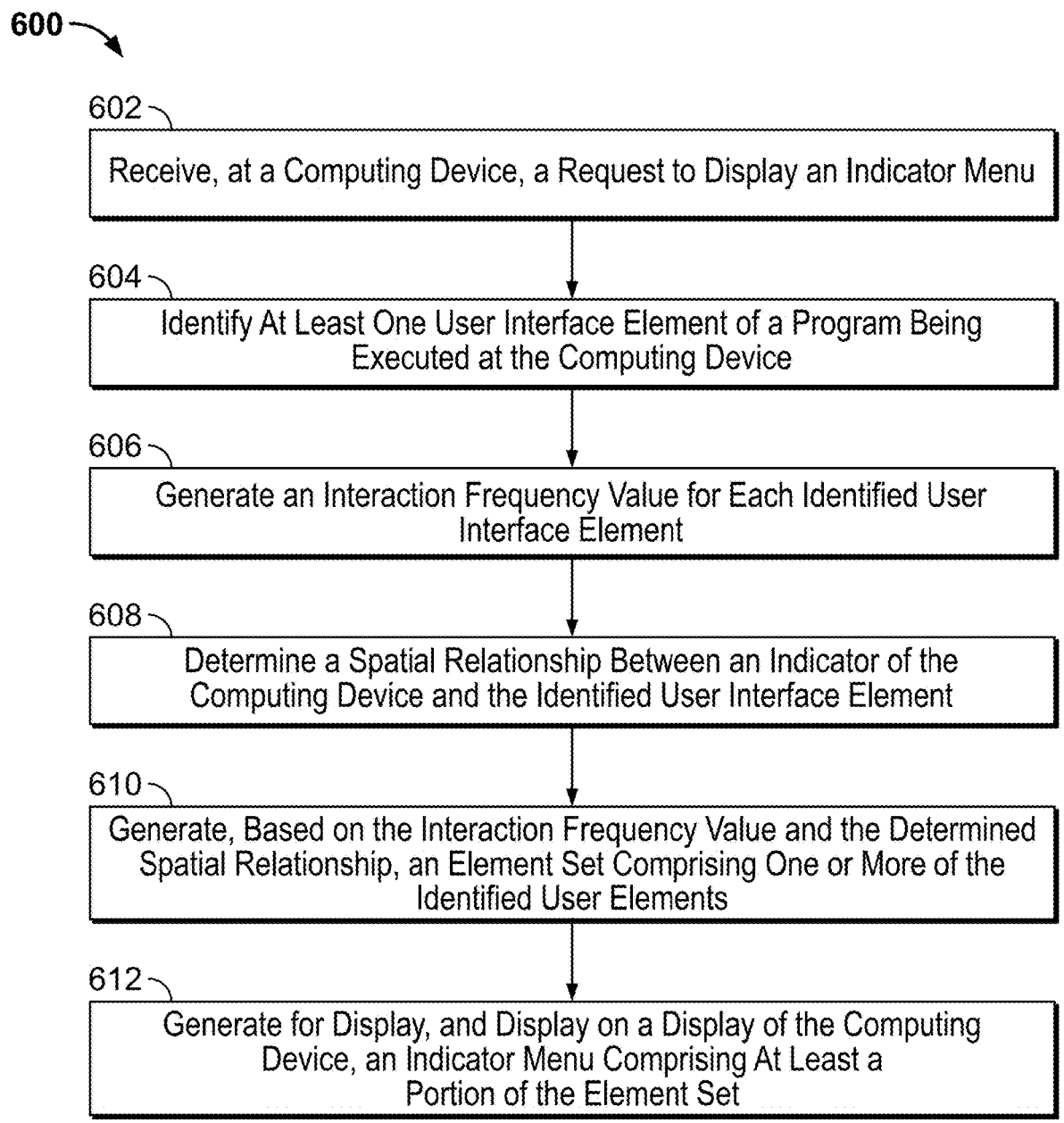
FIG. 6 is a flowchart representing a process for displaying an indicator menu proximate an indicator, in accordance with some embodiments of the disclosure.

FIG. 6 is a flowchart representing a process for displaying an indicator menu proximate an indicator, in accordance with some embodiments of the disclosure. Process 600 may be implemented on any aforementioned computing device 102, 202, 302, 402. In addition, one or more actions of process 600 may be incorporated into or combined with one or more actions of any other process or embodiment described herein.

At 602, a computing device 102, 202, 302, 402, 500 receives a request to display an indicator menu. The request may be generated from a device that is integral to or separate from the computing device 102, 202, 302, 402, 500, for example a button click on a mouse, a touch and/or gesture on a touchpad, a touch and/or gesture on touchscreen, and/or a keystroke and/or combination of keystrokes on a keyboard.

At 604, at least one user interface element of a program being executed at the computing device 102, 202, 302, 402, 500 is identified.

At 606, an interaction frequency value for each identified user interface element is generated. Typically, the interaction frequency values are a set of values that indicate how many times a user has interacted with each identified user interface element since, for example, first using the program (i.e., the values change as the program is used). Alternatively, the interaction frequency values may be a set of values that indicate how often a typical user would interact with each identified user interface element (i.e., the values are static). In another example, a trained artificial intelligence model analyses how a user interacts with the program and generates interaction frequency values that are indicative of a prediction of how often a user is likely to interact with a user interface element based on the user's behavior.

At 608, a spatial relationship between an indicator of the computing device 102, 202, 302, 402, 500 and the identified user interface element is determined. Typically, the absolute distance between an indicator of the computing device 102, 202, 302, 402, 500 and each user interface element may be determined. Alternatively, a relative distance between the indicator and each user interface element, for example with respect to a diagonal distance of a display of the computing device 102, 202, 302, 402, 500, may be determined.

At 610, an element set comprising one or more of the identified user interface elements is generated. Typically, a weighted score may be generated based on the interaction frequency values and the distance, to order the user interface elements in the element set based on frequency of use and distance from the indicator. Alternatively, only user interface elements that are over a threshold distance from the indicator are included in the element set. In another example, there may be a limited number of user interface elements that can be displayed in the indicator menu. To address this limitation, the number of user interface elements in the element set may be reduced based on the interaction frequency values until the number of user interface elements in the element set is equal to the number of user interface elements that can be displayed in an indicator menu.

At 612, an indicator menu comprising at least a portion of the element set is generated for display and is displayed on a display of the computing device 102, 202, 302, 402, 500.

Figure 7:
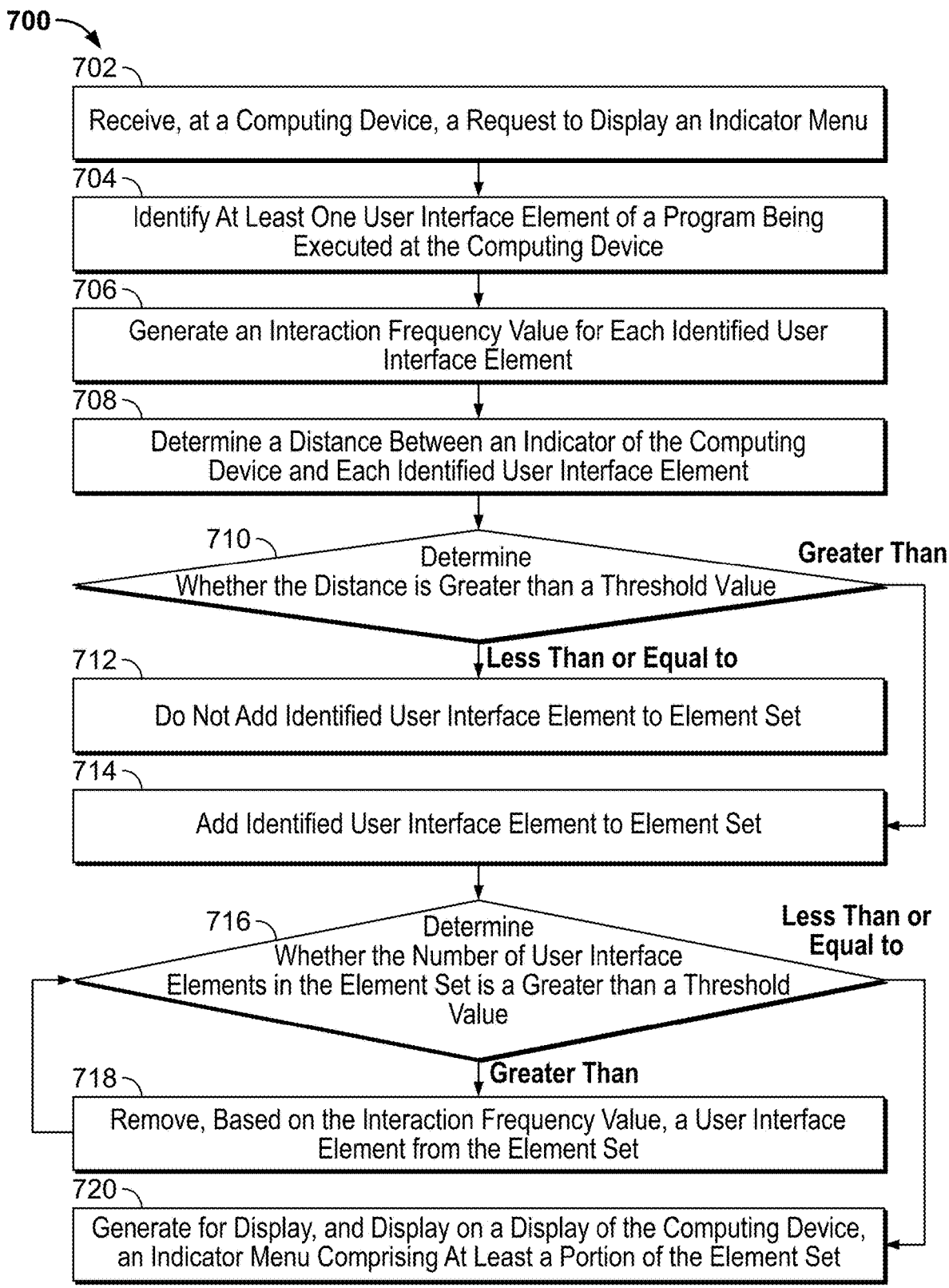
FIG. 7 is another flowchart representing a process for displaying an indicator menu proximate an indicator, in accordance with some embodiments of the disclosure.

FIG. 7 is a flowchart representing a process for displaying an indicator menu proximate an indicator, in accordance with some embodiments of the disclosure. Process 700 may be implemented on any aforementioned computing device 102, 202, 302, 402, 500. In addition, one or more actions of process 700 may be incorporated into or combined with one or more actions of any other process or embodiment described herein.

In a manner similar to the process described in connection with FIG. 6, at 702 a computing device 102, 202, 302, 402, 500 receives a request to display an indicator menu; at 704, at least one user interface element of a program being executed at the computing device 102, 202, 302, 402, 500 is identified; and at 706, an interaction frequency value for each identified user interface element is generated.

At 708, a distance between an indicator of the computing device and each identified user interface element is determined. At 710, it is determined whether the distance is greater than a threshold value. At 712, if the distance is less than or equal to the threshold value, the user interface element is not added to the element set. At 714, if the distance is greater than the threshold value, the user interface element is added to the element set. In this way, only user interface elements that are farther away from the indicator than a threshold distance are added to the indicator menu.

At 716, it is determined whether the number of user interface elements in the element set is greater than a threshold value. At 718, if the number of user interface elements is greater than the threshold value, a user interface element is removed, based on the interaction frequency value (for example, the user interface with the lowest interaction frequency value is removed). Steps 716 and 718 are then repeated until the number of user interface elements is less than or equal to the threshold value. In this way, if there is a limited number of user interface elements that can be displayed proximate to the indicator, any excess user interface elements are removed.

At 720, an indicator menu comprising at least a portion of the element set is generated for display and is displayed on a display of the computing device 102, 202, 302, 402, 500.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for displaying an indicator menu proximate an indicator, the method comprising:
   receiving, at a computing device, a request to display an indicator menu;
   identifying at least one user interface element of a program being executed at the computing device;
   generating an interaction frequency value for each identified user interface element;
   determining, in response to the request and for each identified user interface element, a spatial relationship between an indicator of the computing device and the identified user interface element by determining a distance between the indicator and the identified user interface element;
   generating, based on the interaction frequency value and the determined spatial relationship, an element set comprising one or more of the identified user interface elements, wherein generating the element set comprises:
      determining, for each identified user interface element, whether the distance is greater than a threshold distance value and, where the distance is greater than the threshold distance value, adding the identified user interface element to the element set;
      determining whether the number of user interface elements in the element set is greater than a threshold element value; and
      removing from the element set, based on the interaction frequency value for each identified user interface element, user interface elements until the number of user interface elements is equal to the threshold element value;
   generating, for display, the indicator menu comprising at least a portion of the element set; and
   displaying, proximate the indicator, the indicator menu on a display of the computing device.

2. The method of claim 1, wherein:
   the indicator is an augmented reality indicator displayed in an augmented reality environment generated by the computing device;
   identifying at least one user interface element further comprises identifying each user interface element that has a location that is independent of a real-world object;
   determining the spatial relationship for each identified user interface element further comprises determining a distance between the augmented reality indicator and the identified user interface element; and
   generating the element set further comprises determining, for each identified user interface element, whether the distance is greater than a threshold distance value and, where the distance is greater than the threshold distance value, adding the identified user interface element to the element set.

3. The method of claim 1, wherein:
the indicator is an augmented reality indicator displayed in an augmented reality environment generated by the computing device, the augmented reality indicator having a notional world position;
identifying at least one user interface element further comprises identifying each user interface element that has a location that is associated with a real-world object;
determining the spatial relationship for each identified user interface element further comprises determining a world distance between the notional world position of the augmented reality indicator and the real-world object associated with the user interface element; and
generating the element set further comprises determining, for each identified user interface element, whether the world distance is greater than a threshold distance value and, where the distance is greater than the threshold distance value, adding the identified user interface element to the element set.

4. The method of claim 1, wherein:
the indicator is a cursor displayed on a display of the computing device;
determining the spatial relationship for each identified user interface element further comprises determining a distance between the cursor and each identified user interface element; and
generating the element set further comprises determining, for each identified user interface element, whether the distance is greater than a threshold distance value and, where the distance is greater than the threshold distance value, adding the identified user interface element to the element set.

5. The method of claim 1, wherein:
the indicator is a touch event at a display of the computing device;
determining the spatial relationship for each identified user interface element further comprises determining a distance between the touch event and each identified user interface element; and
generating the element set further comprises determining, for each identified user interface element, whether the distance is greater than a threshold distance value and, where the distance is greater than the threshold distance value, adding the identified user interface element to the element set.

6. The method of claim 1, wherein:
the indicator is a virtual reality indicator displayed in a virtual reality environment generated by the computing device;
identifying at least one user interface element further comprises identifying each user interface element that has a location that is independent of a virtual reality object;
determining the spatial relationship for each identified user interface element further comprises determining a distance between the virtual reality indicator and the identified user interface element; and
generating the element set further comprises determining, for each identified user interface element, whether the distance is greater than a threshold distance value and, where the distance is greater than the threshold distance value, adding the identified user interface element to the element set.

7. The method of claim 1, wherein:
the indicator is a virtual reality indicator displayed in a virtual reality environment generated by the computing device, the virtual reality indicator having a virtual reality environment position;
identifying at least one user interface element further comprises identifying each user interface element that has a location that is associated with a virtual reality environment object;
determining the spatial relationship for each identified user interface element further comprises determining a virtual reality environment distance between the virtual reality environment position of the virtual reality indicator and the virtual reality environment object associated with the user interface element; and
generating the element set further comprises determining, for each identified user interface element, whether the virtual reality environment distance is greater than a threshold distance value and, where the distance is greater than the threshold distance value, adding the identified user interface element to the element set.

8. The method of claim 1, wherein the program being executed is a media player and the at least one user interface element comprises at least one of X-ray, subtitles, volume, expand, close, rewind or fast-forward.

9. The method of claim 1, wherein:
the computing device comprises a display;
determining the spatial relationship further comprises determining the distance between an indicator and a user interface element; and
generating the element set further comprises determining whether the distance is greater than 25% of a diagonal length of the display and, where the distance is greater than 25% of a diagonal length of the display, adding the identified user interface element to the element set.

10. A system for displaying an indicator menu proximate an indicator, the system comprising:
a communication port; and
control circuitry configured to:
receive, at a computing device, a request to display an indicator menu;
identify at least one user interface element of a program being executed at the computing device;
generate an interaction frequency value for each identified user interface element;
determine, in response to the request and for each identified user interface element, a spatial relationship between an indicator of the computing device and the identified user interface element by determining a distance between the indicator and the identified user interface element;
generate, based on the interaction frequency value and the determined spatial relationship, an element set comprising one or more of the identified user interface elements, wherein generating the element set comprises:
determining, for each identified user interface element,
whether the distance is greater than a threshold distance value and, where the distance is greater than the threshold distance value, adding the identified user interface element to the element set;
determining whether the number of user interface elements in the element set is greater than a threshold element value; and
removing from the element set, based on the interaction frequency value for each identified user interface element, user interface elements until the number of user interface elements is equal to the threshold element value;

generate, for display, the indicator menu comprising at least a portion of the element set; and display, proximate the indicator, the indicator menu on a display of the computing device.

11. The system of claim 10, wherein:

the indicator is an augmented reality indicator displayed in an augmented reality environment generated by the computing device;

the control circuitry configured to identify at least one user interface element is further configured to identify each user interface element that has a location that is independent of a real-world object;

the control circuitry configured to determine the spatial relationship for each identified user interface element is further configured to determine a distance between the augmented reality indicator and the identified user interface element; and the control circuitry configured to generate the element set is further configured to determine, for each identified user interface element, whether the distance is greater than a threshold distance value and, where the distance is greater than the threshold distance value, add the identified user interface element to the element set.

12. The system of claim 10, wherein:

the indicator is an augmented reality indicator displayed in an augmented reality environment generated by the computing device, the augmented reality indicator having a notional world position;

the control circuitry configured to identify at least one user interface element is further configured to identify each user interface element that has a location that is associated with a real-world object;

the control circuitry configured to determine the spatial relationship for each identified user interface element is further configured to determine a world distance between the notional world position of the augmented reality indicator and the real-world object associated with the user interface element; and the control circuitry configured to generate the element set is further configured to determine, for each identified user interface element, whether the world distance is greater than a threshold distance value and, where the distance is greater than the threshold distance value, add the identified user interface element to the element set.

13. The system of claim 10, wherein:

the indicator is a cursor displayed on a display of the computing device;

the control circuitry configured to determine the spatial relationship for each identified user interface element is further configured to determine a distance between the cursor and each identified user interface element; and the control circuitry configured to generate the element set is further configured to determine, for each identified user interface element, whether the distance is greater than a threshold distance value and, where the distance is greater than the threshold distance value, add the identified user interface element to the element set.

14. The system of claim 10, wherein:

the indicator is a touch event at a display of the computing device;

the control circuitry configured to determine the spatial relationship for each identified user interface element is further configured to determine a distance between the touch event and each identified user interface element; and the control circuitry configured to generate the element set is further configured to determine, for each identified user interface element, whether the distance is greater than a threshold distance value and, where the distance is greater than the threshold distance value, add the identified user interface element to the element set.

15. The system of claim 10, wherein:

the indicator is a virtual reality indicator displayed in a virtual reality environment generated by the computing device;

the control circuitry configured to identify at least one user interface element is further configured to identify each user interface element that has a location that is independent of a virtual reality object;

the control circuitry configured to determine the spatial relationship for each identified user interface element is further configured to determine a distance between the virtual reality indicator and the identified user interface element; and the control circuitry configured to generate the element set is further configured to determine, for each identified user interface element, whether the distance is greater than a threshold distance value and, where the distance is greater than the threshold distance value, add the identified user interface element to the element set.

16. The system of claim 10, wherein:

the indicator is a virtual reality indicator displayed in a virtual reality environment generated by the computing device, the virtual reality indicator having a virtual reality environment position;

the control circuitry configured to identify at least one user interface element is further configured to identify each user interface element that has a location that is associated with a virtual reality environment object;

the control circuitry configured to determine the spatial relationship for each identified user interface element is further configured to determine a virtual reality environment distance between the virtual reality environment position of the virtual reality indicator and the virtual reality environment object associated with the user interface element; and the control circuitry configured to generate the element set is further configured to determine, for each identified user interface element, whether the virtual reality environment distance is greater than a threshold distance value and, where the distance is greater than the threshold distance value, add the identified user interface element to the element set.

17. The system of claim 10, wherein the program being executed is a media player and the at least one user interface element comprises at least one of X-ray, subtitles, volume, expand, close, rewind or fast-forward.

18. The system of claim 10, wherein:

the computing device comprises a display;

the control circuitry configured to determine the spatial relationship is further configured to determine the distance between an indicator and a user interface element; and the control circuitry configured to generate the element set is further configured to determine whether the distance is greater than 25% of a diagonal length of the display and, where the distance is greater than 25% of a diagonal length of the display, add the identified user interface element to the element set.

* * * * *